US009568374B2

(12) United States Patent
Farago et al.

(10) Patent No.: US 9,568,374 B2
(45) Date of Patent: Feb. 14, 2017

(54) SENSOR MOUNTING METHODOLOGY

(71) Applicant: SCHNEIDER ELECTRIC USA INC., Palatine, IL (US)

(72) Inventors: Jeffrey J. Farago, Franklin, TN (US); Marcelo A. Perez, Franklin, TN (US); Stewart John Harding, Victoria (CA)

(73) Assignee: SCHNEIDER ELECTRIC USA, INC., Andover, MA (US)

(*) Notice: Subject to any disclaimer, the term of this patent is extended or adjusted under 35 U.S.C. 154(b) by 382 days.

(21) Appl. No.: 14/257,387

(22) Filed: Apr. 21, 2014

(65) Prior Publication Data

US 2015/0049787 A1 Feb. 19, 2015

Related U.S. Application Data

(62) Division of application No. 13/171,764, filed on Jun. 29, 2011, now Pat. No. 8,702,303.

(51) Int. Cl.
G01K 1/14 (2006.01)
G01K 1/16 (2006.01)
(Continued)

(52) U.S. Cl.
CPC ............... *G01K 1/14* (2013.01); *G01K 1/026* (2013.01); *G01K 1/143* (2013.01); *G01K 13/00* (2013.01)

(58) Field of Classification Search
CPC ..................................... G01K 1/14; G01K 1/16
See application file for complete search history.

(56) References Cited

U.S. PATENT DOCUMENTS 4,859,081 A 8/1989 Kabayashi
5,248,927 A * 9/1993 Takei ................. H01M 2/1055
320/113
(Continued)

FOREIGN PATENT DOCUMENTS

CN 202221910 U * 5/2012
EP 603832 A1 6/1994
(Continued)

OTHER PUBLICATIONS

Carol Maxwell & E.S. Gurdjian, F76350: Monitoring Battery Temperature Using an Adapted Temperature Sensor With Your Charger Can Increase the Life of Your House Batteries.3, pages (Prior to Jun. 29, 2011).
(Continued)

Primary Examiner — Gail Kaplan Verbitsky
(74) Attorney, Agent, or Firm — Lando & Anastasi, LLP

(57) ABSTRACT

Methods and devices for mounting a sensor are presented herein. A temperature sensor assembly for a capacitor bank is disclosed that includes two opposing substrates, and a plurality of contact temperature sensors attached to each substrate. Each temperature sensor is configured to directly contact a surface of one of the capacitor cans in the capacitor bank and therefrom generate a signal indicative of the temperature of the capacitor can. A biasing member attaches the two substrates together. The biasing member is configured to selectively contract, such that the width of the sensor assembly is less than the gap distance between adjacent sets of tandem capacitor cans and the sensor assembly can insert between the sets of capacitor cans, and expand, such that the width of the sensor assembly is greater than the gap distance and the sensor assembly is tensioned against and thereby secured between the sets of capacitor cans.

20 Claims, 5 Drawing Sheets

(51) Int. Cl.
*G01K 1/02* (2006.01)
*G01K 13/00* (2006.01)

(56) References Cited

U.S. PATENT DOCUMENTS

| | | | |
|---|---|---|---|
| 5,285,054 A | | 2/1994 | Barsky |
| 5,363,703 A | * | 11/1994 | Delatorre .................. G01L 9/12 361/283.3 |
| 5,527,111 A | | 6/1996 | Lysen et al. |
| 5,585,710 A | * | 12/1996 | Nakamura ............. H01M 2/105 320/112 |
| 5,767,659 A | * | 6/1998 | Farley ................... H01M 10/46 320/106 |
| 6,066,936 A | | 5/2000 | Okamura et al. |
| 6,411,063 B1 | * | 6/2002 | Kouzu .................. B60L 3/0046 320/150 |
| 6,777,910 B2 | | 8/2004 | Small |
| 7,000,478 B1 | | 2/2006 | Zwollo et al. |
| 7,434,989 B2 | | 10/2008 | Solie |
| 7,477,505 B2 | | 1/2009 | Timmerman et al. |
| 8,149,567 B2 | * | 4/2012 | Niigaki .................... H01G 2/04 361/274.2 |
| 8,282,275 B2 | * | 10/2012 | Akaboshi ............. H01M 2/1077 320/134 |
| 8,287,185 B2 | | 10/2012 | Pulliam et al. |
| 8,534,912 B2 | | 9/2013 | Schmidt |
| 8,702,303 B2 | | 4/2014 | Farago et al. |
| 8,817,428 B2 | * | 8/2014 | Perez ....................... H01G 2/14 361/15 |
| 8,980,452 B2 | * | 3/2015 | Hong .................... H01M 2/105 429/7 |
| 9,305,511 B2 | * | 4/2016 | Ma ....................... G09G 3/3614 |
| 9,379,367 B2 | * | 6/2016 | Lee ...................... H01M 2/1077 |
| 2005/0099163 A1 | * | 5/2005 | Liepold ................. G01K 17/06 320/150 |
| 2005/0231365 A1 | | 10/2005 | Tester et al. |
| 2006/0028173 A1 | * | 2/2006 | Sellers ................ H01M 2/1022 320/112 |
| 2006/0231546 A1 | | 10/2006 | Reithofer et al. |
| 2007/0048596 A1 | | 3/2007 | Hasegawa et al. |
| 2009/0022206 A1 | | 1/2009 | Shibuya et al. |
| 2009/0139781 A1 | * | 6/2009 | Straubel ............. B60L 11/1875 180/65.1 |
| 2009/0231764 A1 | | 9/2009 | Banting et al. |
| 2009/0286143 A1 | * | 11/2009 | Matthias ............. H01M 10/486 429/90 |
| 2010/0060243 A1 | | 3/2010 | Niigaki et al. |
| 2010/0067562 A1 | | 3/2010 | Wakabayashi |
| 2010/0141208 A1 | * | 6/2010 | Deal ..................... H01M 2/204 320/116 |
| 2010/0151309 A1 | * | 6/2010 | Marukawa .......... H01M 2/1077 429/120 |
| 2012/0225334 A1 | | 9/2012 | Lee |
| 2012/0315508 A1 | * | 12/2012 | Kurita ................. H01M 2/1077 429/7 |
| 2013/0078487 A1 | | 3/2013 | Shin et al. |
| 2013/0171480 A1 | * | 7/2013 | Englert ................. B60L 3/0046 429/50 |
| 2013/0337298 A1 | * | 12/2013 | Iwamura ............. H01M 10/486 429/61 |
| 2015/0364799 A1 | * | 12/2015 | Miller .................... H02J 5/005 320/108 |

FOREIGN PATENT DOCUMENTS

| | | | |
|---|---|---|---|
| JP | 61-21984 | | 9/1986 |
| JP | 11-153495 | | 6/1999 |
| JP | 2006017406 A | | 1/2006 |
| JP | 2006250734 A | * | 9/2006 |
| JP | 2012069712 A | | 4/2012 |
| JP | 201486793 A | * | 2/2014 |

OTHER PUBLICATIONS

International Search Report corresponding to co-pending International Patent Application Serial No. PCT/US2012/042203, European Patent Office, dated May 10, 2013; (4 pages).
International Written Opinion corresponding to co-pending International Patent Application Serial No. PCT/US2012/042203, European Patent Office, dated May 10, 2013; (5 pages).
Schneider Electric: Installation Instructions for Replacing Varplus2 Capacitors in AT6000, 6 pages (Prior to Jun. 29, 2011).
Schneider Electric: Installation Instructions for Replacing Varplus2 Capacitors in AV6000, 6 pages (Prior to Jun. 29, 2011).
Schneider Electric: Varplus"LV Capacitor User Manuel", 4 Pages, (Dec. 2008).
Xantrex International: Xantrex LinkPro Battery Monitor Temperature Sensor Kit, 1 Page (May 2008).

* cited by examiner

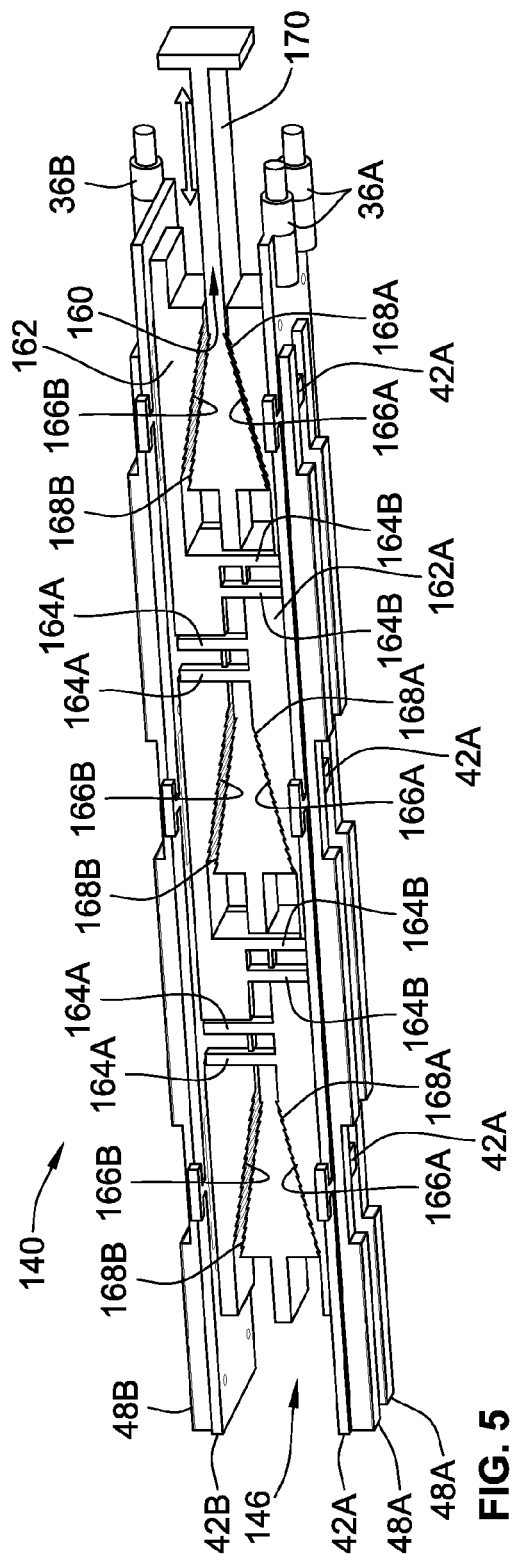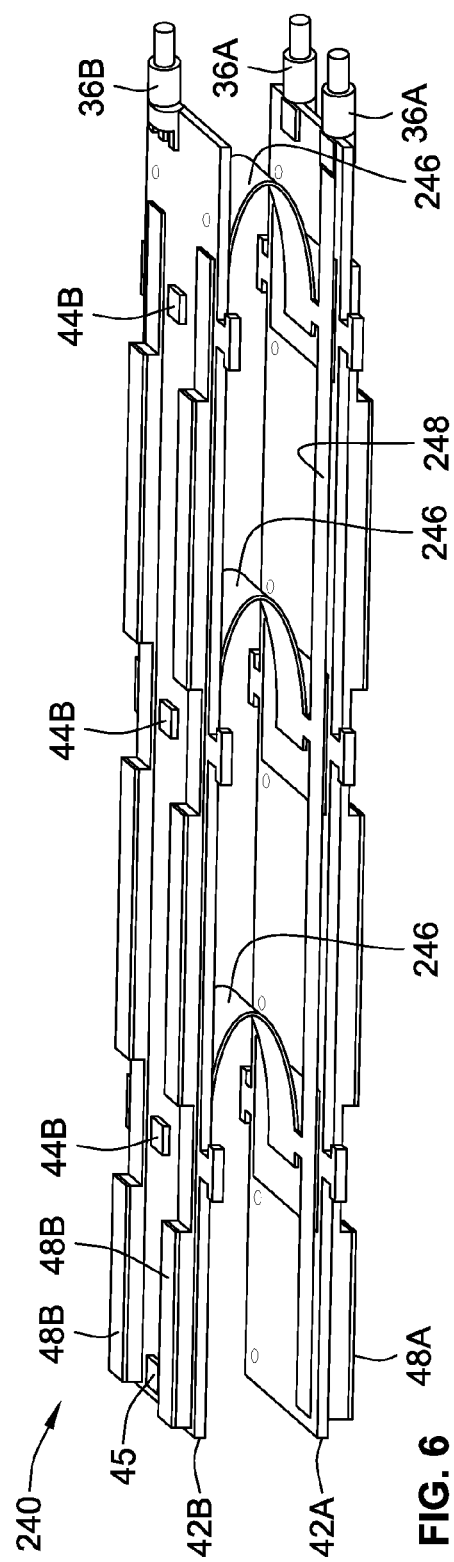

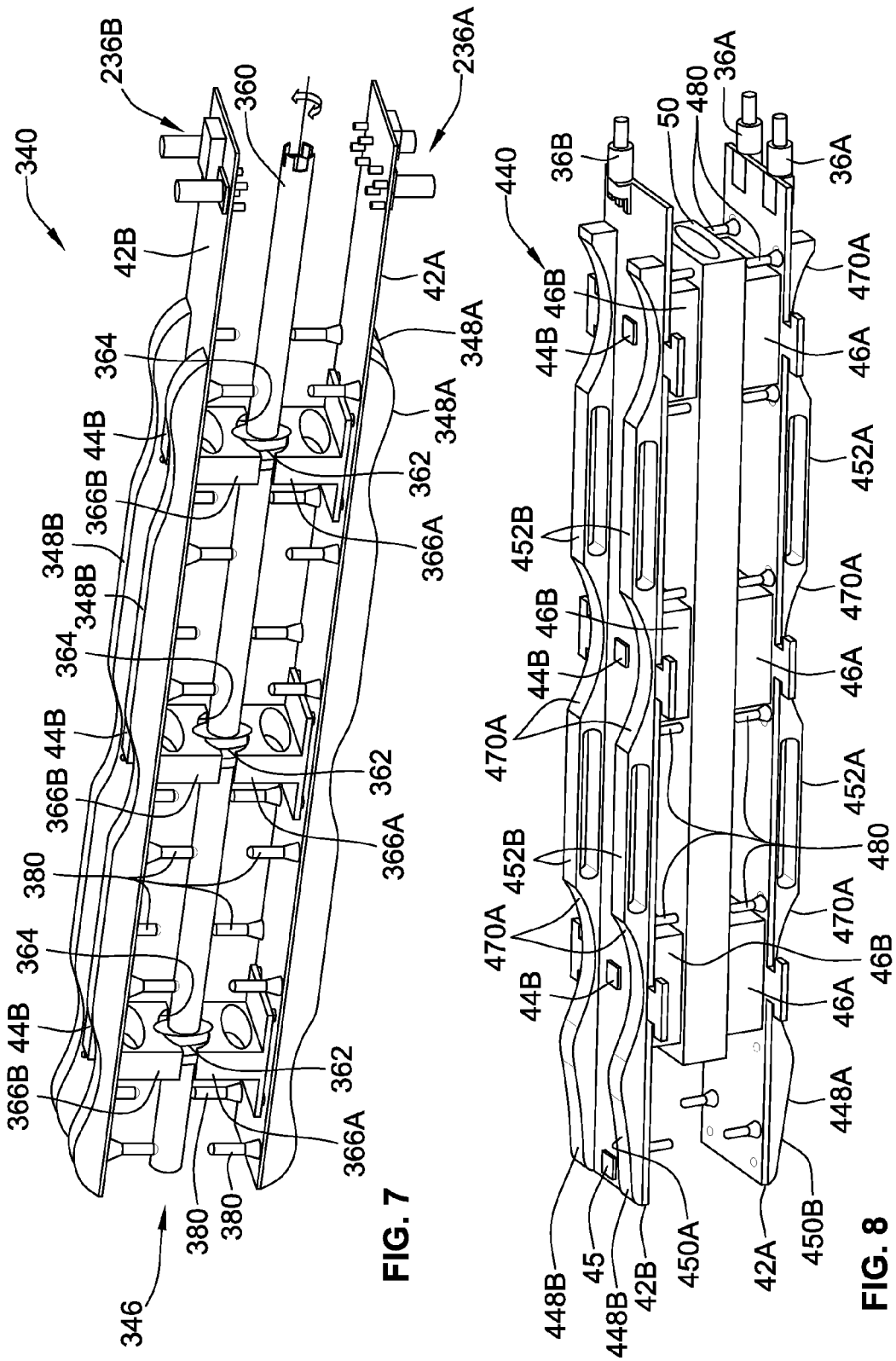

SENSOR MOUNTING METHODOLOGY

RELATED APPLICATION

This application is a divisional of pending U.S. patent application Ser. No. 13/171,764, filed Jun. 29, 2011, and entitled SENSOR MOUNTING METHODOLOGY, which is incorporated herein by reference in its entirety for all purposes.

TECHNICAL FIELD

The present disclosure relates generally to sensors and monitoring devices. Aspects of the present disclosure relate more particularly to methods and devices for mounting contact temperature sensors to capacitor cans in a capacitor bank.

BACKGROUND

Conventional utility networks supply utilities for commercial, residential and industrial purposes. Regularly supplied utilities include, for example, water, air, gas, electricity, and steam, which are collectively designated by the acronym WAGES. In a typical electrical distribution system, for example, electrical energy is generated by an electrical supplier or utility company and distributed to consumers via a power distribution network. The power distribution network is often a network of electrical distribution wires (more commonly known as "electrical transmission lines") which link the electrical supplier to its consumers. Additional devices, such as bus bars, switches (e.g., breakers or disconnectors), power transformers, and instrument transformers, which are typically arranged in switch yards and/or bays, are automated for controlling, protecting, measuring, and monitoring of substations.

Typically, electricity from a utility is fed from a primary station over a distribution cable to several local substations. At the local substations, the supply is transformed by distribution transformers from a relatively high voltage on the distributor cable to a lower voltage at which it is supplied to the end consumer. From the local substations, the power is provided to industrial users over a distributed power network that supplies power to various loads. Such loads may include, for example, various power machines, lighting, HVAC systems, etc.

In general, the power factor of a multi-phase alternating current (AC) electric power system is the ratio of the real (or "active") power used in a circuit to the apparent power used by the circuit. Real power, which is typically expressed in watts (W) or kilowatts (kW), is the capacity of the circuit for performing work in a particular time, whereas apparent power, which is typically expressed in volt-ampere (VA) or kilo volt-ampere (kVA), is the product of the current and voltage of the circuit. Power factor correction (PFC) can be achieved, for example, by switching in or out banks (or racks) of capacitors. A capacitor bank is typically composed of a number of discrete steps that can be switched in and out of operation. Each step is composed of a number of individual low-inductance capacitors that are wired in parallel (or series, depending upon the system), and sum together to provide the total capacitance for the step. In general, capacitor banks act to maintain a relatively constant power factor over a particular site or a portion of an electric distribution system to maximize the real power transfer capacity of the conductors and minimize the loses of the electric distribution system.

Power capacitors are naturally prone to aging effects that can change their electrical characteristics (e.g., capacitance, internal resistance, etc.), which in turn can reduce their effectiveness. Depending on the constituent materials, the design type, and the details of manufacturing, for example, some capacitors may be prone to different types of failure if their electrical characteristics change at a faster rate than expected from normal aging. In some cases, these failures can be mitigated by a self-protection mechanism, which is activated, for example, by overpressure, overtemperature, and/or overcurrent, removing the capacitor from the circuit. Other cases may lead to a failure where the self-protection mechanism fails to operate.

It is common today for capacitor bank installations to have very limited or no monitoring and diagnostics available, due in part to limited available packaging space within the capacitor bank cabinet (or "locker") and the expense associated with monitoring the individual capacitors in a capacitor bank. As a result of this lack of monitoring and diagnostics, it is very difficult to detect operational problems before they occur in order to mitigate operational concerns and minimize service disruption through regular maintenance efforts. However, in some applications, the use of sensors placed in intimate contact with the surface being monitored can provide valuable information that can be used, for example, to anticipate future problems, e.g., for monitoring temperature, vibration, or deformation. Consequently, there is a need for methods and devices for mounting sensors in a capacitor bank that address the foregoing issues.

SUMMARY

Aspects of this disclosure are directed to various techniques for placing a sensor (or sensor chip assembly) in intimate contact with a surface being monitored (e.g., for taking temperature measurements, vibration readings, deformation readings, etc.). Aspects of this disclosure are also directed to intimate-sensor-mounting methods for use with in-line or parallel device arrangements. Additional aspects provide an attachment method for achieving intimate sensor contact as it applies to retrofit installations. Such installations often require a dimensionally flexible approach to allow for variations in spacing and product contours, which this methodology supports.

In some exemplary configurations, a sensor arrangement is described that is designed to fit between rows of individual capacitor cans, and be easily installed as a retrofit in the field. In particular, methods and devices are disclosed for applying temperature sensors to the outside of individual capacitor cans in a bank of capacitors already installed in an electrical cabinet. This is achieved, in some embodiments, by having the sensors either integrated into a printed circuit board layout (e.g., for wired installations) or mounted on a substrate solely for support and positioning (e.g., for a wireless installation). The circuit board/substrate acts as a holding device for the sensors, and allows the sensors to be pressed against the device being monitored. In some preferred embodiments, a "sensor stick" will be inserted between two rows of capacitors, expanded, and pressed up against the sides of the capacitors.

According to aspects of the present disclosure, a temperature sensor assembly for a capacitor bank is disclosed. The capacitor bank includes a first set of tandem capacitor cans that is generally parallel to and spaced a gap distance from a second set of tandem capacitor cans. The temperature sensor assembly includes first and second opposing substrates, and first and second pluralities of contact temperature sensors, each of which is mounted to a respective one of the substrates. Each contact temperature sensor is configured to directly contact a surface of one of the capacitor cans and therefrom generate a signal indicative of the temperature of the capacitor can. A biasing member attaches the first and second substrates together. The biasing member is configured to selectively contract to a first thickness such that the width of the sensor assembly is less than the gap distance and the sensor assembly can insert between the two sets of tandem capacitor cans. The biasing member is also configured to selectively expand to a second thickness such that the width of the sensor assembly is greater than the gap distance and the sensor assembly, once inserted, is tensioned against and thereby secured between the first and second sets of tandem capacitor cans.

According to another aspect of the present disclosure, a capacitor bank assembly is presented. The capacitor bank assembly includes first and second sets of capacitor cans that are housed by a cabinet. The second set of capacitor cans is generally parallel to and spaced from the first set of capacitor cans. A temperature sensor assembly is interposed between the two sets of capacitor cans. The temperature sensor assembly includes a first substrate with a first plurality of sensors mounted thereto, and a second substrate with a second plurality of sensors mounted thereto. Each sensor directly contacts a surface of one of the cans in the sets of capacitor cans and therefrom generates a signal indicative of the temperature of the can. A biasing member attaches the first and second substrates together. The biasing member is configured to transition between a first thickness, whereby the sensor assembly is removable from between the first and second sets of capacitor cans, and a second thickness, whereby the sensor assembly is tensioned against and secured between the first and second sets of capacitor cans.

According to yet another aspect of the present disclosure, a sensor assembly is presented for monitoring a characteristic of a device. The sensor assembly includes a substrate and a sensor mounted to the substrate. The sensor is configured to directly contact a surface of the device and therefrom generate a signal indicative of the characteristic being monitored. A biasing member is attached to the substrate and configured to contract and expand. By contracting the biasing member, the sensor assembly narrows allowing for insertion between the device and an adjacent surface. By expanding the biasing member, the sensor assembly is tensioned against and secured between the device and the adjacent surface.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

BRIEF DESCRIPTION OF THE DRAWINGS

The present disclosure is susceptible to various modifications and alternative forms. Specific embodiments are shown by way of example in the drawings and will be described in detail below. It should be understood, however, that the present disclosure is not intended to be limited to the particular forms disclosed. Rather, the present disclosure is to cover all modifications, equivalents, and alternatives falling within the spirit and scope of the invention as defined by the appended claims.

FIG. 5 is a perspective-view illustration of another exemplary sensor assembly according to aspects of the present disclosure.

FIG. 6 is a perspective-view illustration of yet another exemplary sensor assembly according to aspects of the present disclosure.

FIG. 7 is a perspective-view illustration of even yet another exemplary sensor assembly according to aspects of the present disclosure.

FIG. 8 is a perspective-view illustration of yet another exemplary sensor assembly according to aspects of the present disclosure.

DETAILED DESCRIPTION OF ILLUSTRATED EMBODIMENTS

Figure 1:
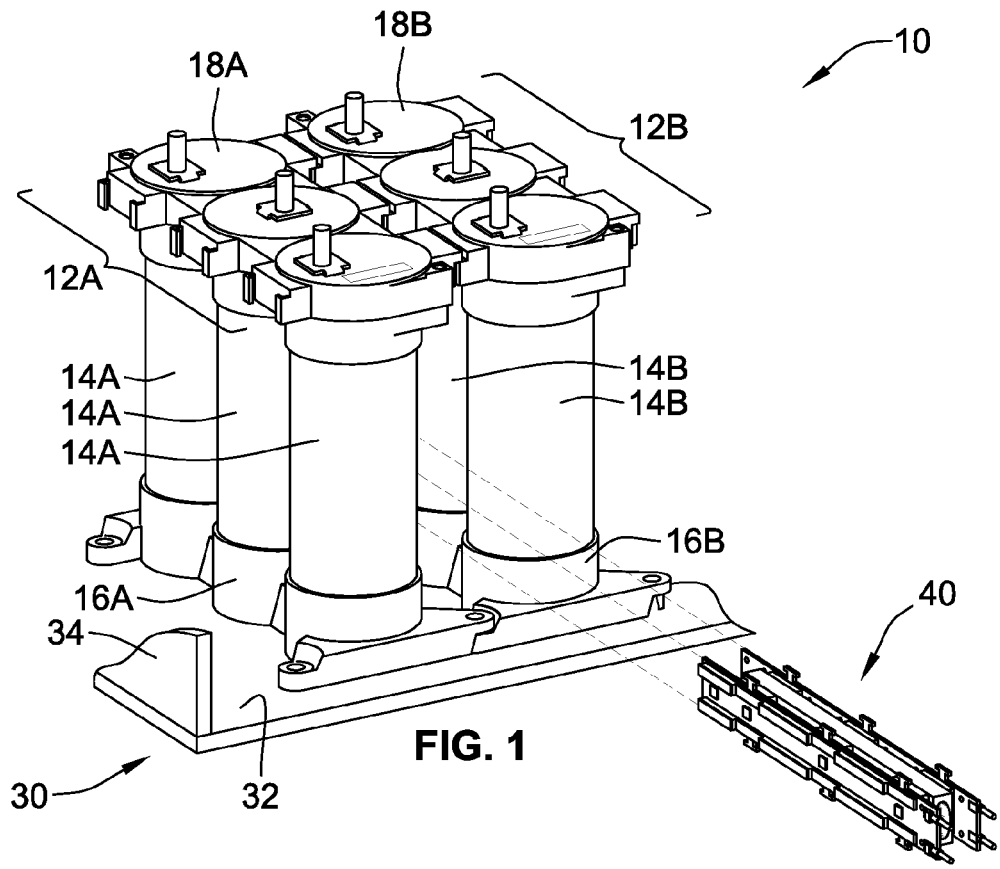
FIG. 1 is a perspective-view illustration of an example of a capacitor bank with a representative sensor assembly in accordance with aspects of the various embodiments disclosed herein.

While aspects of the present disclosure are susceptible of embodiment in many different forms, there is shown in the drawings and will herein be described in detail representative embodiments of the present disclosure with the understanding that the present disclosure is to be considered as an exemplification of the various aspects and principles of the present disclosure, and is not intended to limit the broad aspects of the present disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise.

Referring to the drawings, wherein like reference numerals refer to like components throughout the several views, FIG. 1 is a perspective-view illustration of a capacitor bank, designated generally as 10, in accordance with aspects of the present disclosure. The capacitor bank 10 is represented herein by a number of illustrative components, including a first set of tandem capacitor cans 12A in opposing relation to a second set of tandem capacitor cans 12B. The first set of capacitor cans 12A includes three cylindrical capacitor elements (also referred to herein as "capacitor cans") 14A that are spaced from and generally parallel to three cylindrical capacitor elements 14B of the second set of capacitor cans 12B (only two of which are visible in FIGS. 1 and 2, but the third is visible in FIG. 3). A respective support base 16A and 16B interconnects each set of capacitor cans 12A, 12B, respectively, along the bottom ends thereof, while a cover or "cap" 18A, 18B interconnects the capacitor cans 14A, 14B in each set 12A, 12B, respectively, along top ends thereof.

The first and second sets of tandem capacitor cans 12A, 12B can be indicative of an entire capacitor module, or just a representative portion thereof. In that vein, the features of the present disclosure are not limited to the single module, two set, six-can implementation presented in FIGS. 1-3. Rather, these features are similarly amenable to capacitor banks with more than one capacitor module, each capacitor module comprising greater or fewer than two sets of capacitor cans, each set comprising greater or fewer than three capacitor elements.

Figure 2:
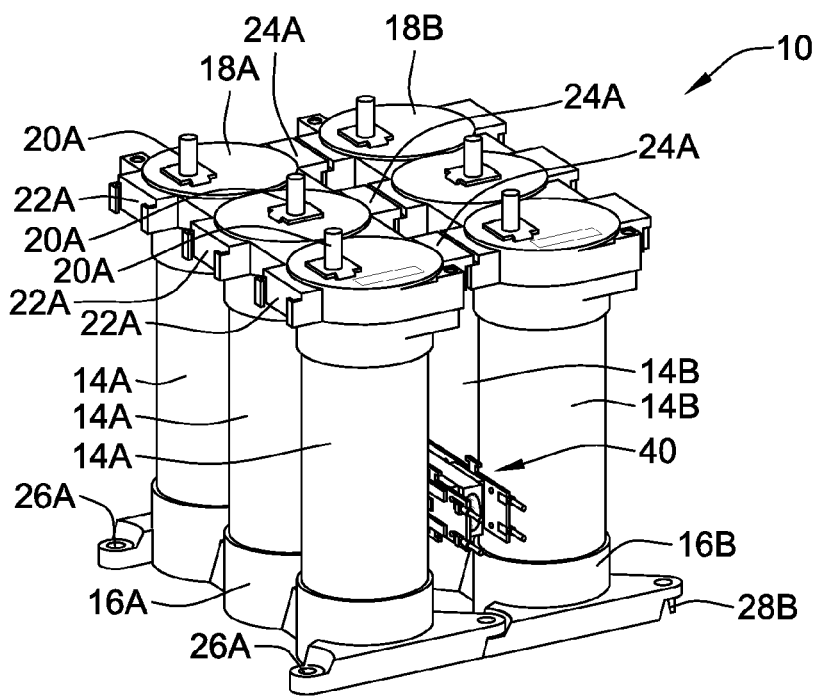
FIG. 2 illustrates the sensor assembly of FIG. 1 installed within the exemplary capacitor bank.
Figure 3:
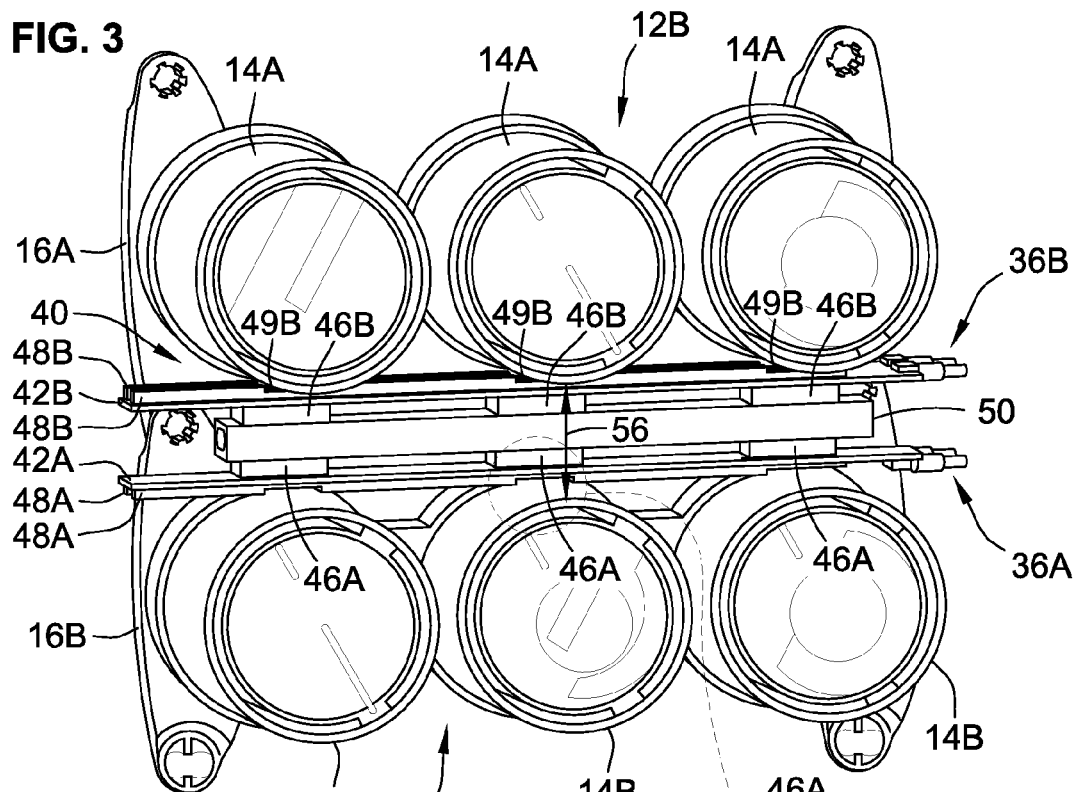
FIG. 3 is a top perspective-view illustration of the exemplary capacitor bank of FIG. 1 with the capacitor caps removed to show the sensor assembly in intimate contact with and attached to a number of capacitor cans in the capacitor bank.

Although not necessarily required to practice the aspects of the present disclosure, the first and second sets of tandem capacitor cans 12A, 12B illustrated in FIGS. 1-3 are substantially structurally identical; thus, for brevity and conciseness, additional features of the two sets 12A, 12B will be described with respect to the first set of capacitor cans 12A shown in FIG. 2. During normal operation, the two sets of capacitor cans 12A, 12B are mechanically and electrically coupled together. For example, each of the capacitor cans 14A includes an electrically conductive power terminal 20A that projects upwardly from the capacitor cap 18A. The terminal 20A of each can 14A is electrically coupled to the terminal of an adjacent capacitor can 14B in the second set 12B, for example, via an elongated electrical interconnection bar that is secured in place by a nut and contact washer (none of which are shown). Protective covers (not shown) can be attached to the capacitor caps 18A, 18B to shield the terminals 20A from tampering and the surrounding environment. It is certainly envisioned that alternative means could be employed to electrically couple the various capacitor cans 14A, 14B shown in the drawings.

In the illustrated embodiment, three female guide slots 22A, which are disposed on a first side of the capacitor cans 14A, project laterally from the capacitor cap 18A. Complementary male slide-rails 24A are disposed on a second side of the capacitor cans 13A, projecting laterally from the capacitor cap 18A in the opposite direction of the female guide slots 22A. Additionally, the support base 16A is provided with a pair of fixing holes 26A on the first side of the capacitor cans 14A subjacent the female guide slots 22A, and a pair of fixing posts (not visible on the first support base 16A, but shown in FIG. 2 at 28B) protruding downward from the sport base 16A on the second side of the capacitor cans 14A subjacent the male slide-rails 24A. FIGS. 1 and 2 show that the first and second sets of tandem capacitor cans 12A, 12B are mechanically connected by aligning and sliding each of the male slide-rails 24A on the first capacitor cap 18A into a corresponding female guide slot of the second capacitor cap 18B. In so doing, the fixing posts on the support base 16A of the first set 12A are aligned with and received by a corresponding fixing hole in the support base 16B of the second set 12B. Each set of tandem capacitor cans 12A, 12B can be fastened to a shelf 32 inside a capacitor bank cabinet 30 next to and generally parallel with the cabinet side walls 34. The mechanical attachment means discussed above are exemplary in nature, and should in no way be construed as necessary limitations.

Only selected components of the capacitor bank 10 have been shown and were described in detail hereinabove. Nevertheless, the capacitor bank 10 can include numerous additional components, such as a control module, a fuse assembly, a switching module, a reactor, safety doors on the cabinet, cable harnesses, racking units, relays, and other well known peripheral components. Seeing as these components are well known in the art, they will not be described in further detail herein.

In the illustrated embodiment, each of the sets 12A, 12B in the capacitor bank 10 is composed of one or more individual capacitors that are wired in parallel. In the electrical utility context, the capacitor bank 10 can be based on, for example, REACTIVAR® AV4000 and AV5000 Standard Automatic Power Factor capacitor banks, the REACTIVAR® AV6000 Anti-Resonant Power Factor capacitor bank, or the REACTIVAR® Medium Voltage Automatic Power Factor Correction banks, all of which are available from Schneider Electric USA, Inc. Likewise, the individual capacitors 14A, 14B are shown as VARPLUS$^2$® LV capacitors, but could also be based on other capacitor configurations, such as REACTIVAR® dry fixed capacitors and REACTIVAR® MVC fixed capacitors, all of which are also available from Schneider Electric.

In accordance with the present disclosure, a sensor assembly, one of which is designated generally at 40 in FIGS. 1-3, is shown being inserted into (FIG. 1) and mounted on (FIG. 2) the capacitor bank 10. Generally speaking, the sensor assembly 40 is designed for monitoring a characteristic of a device. By way of non-limiting example, the sensor assembly 40 can be designated as a temperature sensor assembly for monitoring the temperatures of the individual capacitors cans 14A, 14B in the capacitor bank 10, as developed further below. However, the sensor assembly 40 can be utilized to monitor a variety of different characteristics, singly or in combination, and can be employed to monitor alternative devices besides capacitor cans without departing from the scope and spirit of the present invention. For example, the sensor assembly 40 could also be designed to monitor vibration, deformation, current, etc. In addition, the sensor assembly 40 can be employed to monitor other devices, such as the individual battery modules in a battery pack.

Figure 4:
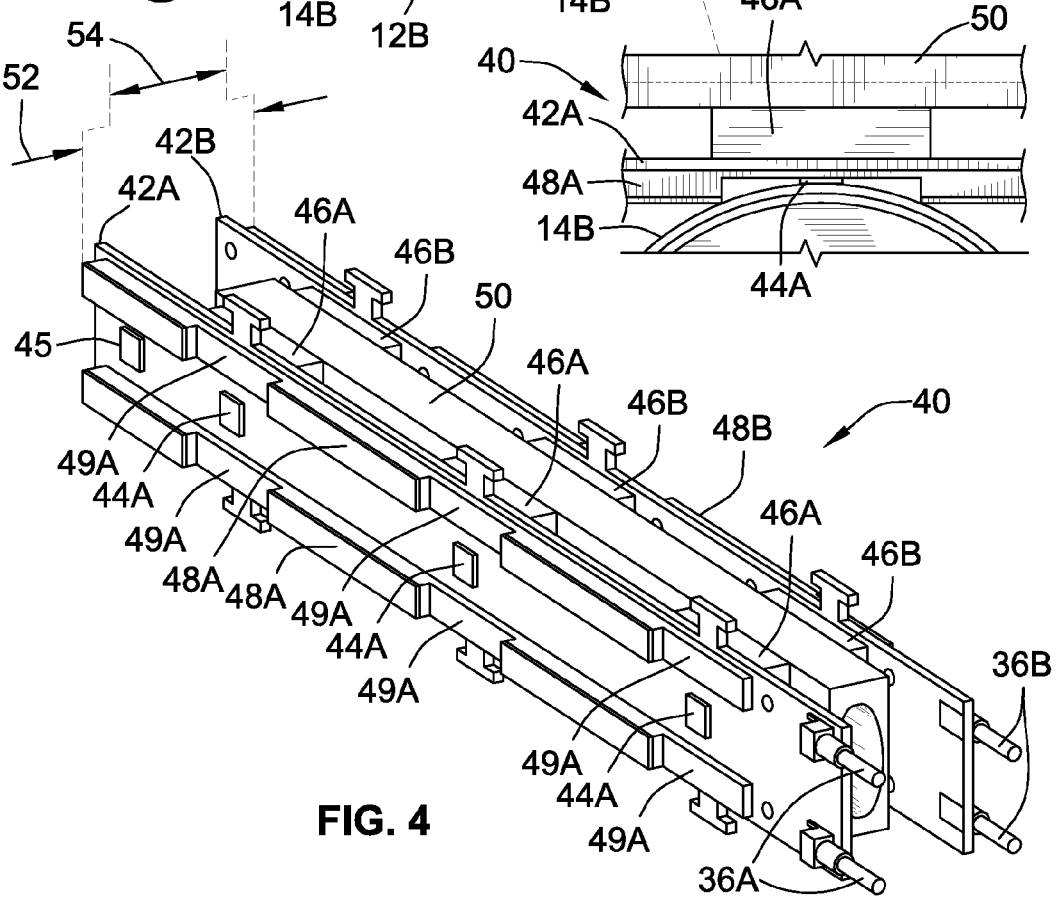
FIG. 4 is a perspective-view illustration of an exemplary sensor assembly according to aspects of the present disclosure.

With reference to FIGS. 3 and 4, the sensor assembly 40 includes at least one, and sometimes preferably two opposing substrates 42A and 42B. Depending, for example, on the intended application, such as a "wireless" scenario, the first and second substrates 42A, 42B are elongated panels formed from a rigid polymer which are oriented in a generally parallel, opposing spaced relation to one another. Alternatively, each of the substrates 42A, 42B can include a printed circuit board (PCB), which provides a path for transmitting "outgoing" signals—i.e., those generated by the sensors, and, in some applications, provides a path for "incoming" signals, such as those generated by an Intelligent Electronic Device (IED) for regulating the sensor 40. These "paths" can be provided, for example, by way of electrically conductive pathways, tracks, or signal traces that are etched from copper sheets and laminated onto a non-conductive substrate by an epoxy resin. In a "wired" scenario," the substrates 42A, 42B can also include connectors 36A and 36B, which are represented herein by SMA (SubMiniature version A) coax connectors, for transmitting input and/or output signals via wires/cables, which connect, for example, to a monitoring device and a data collection system (e.g. via a concentrator box). In a "wireless" scenario, these connectors 36A, 36B can be replaced, for example, by transmitters or transceivers. A mounting layout that is compatible with the sensor chip or package footprint would allow for attachment to the substrate via soldering, as well as, provide repeatable and accurate positioning of the sensors. Adhesives, snap connections, and other attachment means are also available other than the aforementioned soldering method.

A sensor is mounted to each of the substrates 42A, 42B. In the illustrated embodiment, for example, a first plurality of contact temperature sensors 44A are integrated into and evenly spaced longitudinally along the first substrate 42A.

Similarly, a second plurality of contact temperature sensors 44B (not visible in FIG. 3 or 4, but represented in FIGS. 6 and 8) are integrated into and evenly spaced longitudinally along the second substrate 42B. The contact temperature sensors 42A, 42B are positioned along the panels 42A, 42B such that each sensor 42A, 42B aligns for contact with a respective one of the capacitor cans 14A, 14B when the sensor assembly 40 is inserted into the capacitor bank 10. Each of the sensors 44A, 44B is configured to directly (or intimately) contact an outer surface of a respective capacitor can 14A, 14B and therefrom generate a signal indicative of the characteristic being monitored (e.g., the individual temperatures of the can 14A, 14B), as illustrated by the enlarged inset-view of FIG. 3. In other words, the three sensors 44A mounted to the first substrate 42A each contacts a single one of the capacitor cans 14B in the second set 12B, whereas the three sensors 44B mounted to the second substrate 42B each contacts a single one of the capacitor cans 14A in the first set 12A. Optionally, an ambient temperature sensor 45 can be attached to the substrate(s) 42A, 42B, displaced from and not contacting the capacitor cans 14A, 14B. Improved contact can be facilitated through the use of an intermediary thermally conductive pad or compound (e.g. silicone rubber, grease, gel).

The sensors 44A, 44b can take on a variety of different forms, individually and collectively, depending, for example, on the characteristics being monitored by the sensor assembly 40. In some embodiments, the sensors 44A, 44B are radio frequency (RF) surface acoustic wave (SAW) sensing devices. One type of RF SAW temperature sensor is disclosed in U.S. Pat. No. 7,434,989 B2, to Solie, which is incorporated herein by reference in its entirety. Additional information regarding SAW type temperature sensors can be found in the following articles, both of which are incorporated herein by reference: E. Benes, M, Groschl, F. Seifert, "Comparison Between BAW and SAW Sensor Principles," IEEE Trans. Ultrasonics, Ferroelectrics, and Frequency Control, Vol. 45, 1314 (1998). L. Reindl, et al., "Wireless Measurement of Temperature using Surface Acoustic Waves Sensors," IEEE Trans. Ultrasonics, Ferroelectrics, and Frequency Control, Vol. 51, 1457 (2004). General information regarding other contact temperature sensors can be found in U.S. Pat. No. 5,527,111, to Heinrich Lysen et al., and U.S. Pat. No. 4,859,081, to Seishiro Kabayashi. It is also envisioned that other types of temperature sensing devices be incorporated into the sensor assembly 40, such as thermocouples or resistive thermal devices (RTDs). In a wireless configuration, energy harvesting devices (based on heat or electric field, for example) could be employed to power the sensors. Other types of sensors could be deployed, such as vibration sensors, or contact pressure sensors in conjunction with, or independent of the temperature sensors. The board mounting layout provides repeatable and highly accurate positioning of the sensors 44A, 44B (e.g. accurately matched with the centerline spacing of subject monitored devices). The substrates 42A, 42B provide a consistent surface that can be pressed against the device(s) being monitored, thereby placing the sensors in intimate contact with the device surface(s).

At least one, and in some embodiments a number of biasing members 46A and 46B are attached to one or more of the substrates 42A, 42B. As shown in the exemplary embodiment of FIGS. 3 and 4, a hollow but rigid retainer 50 is generally parallel to and located in between the first and second substrates 42A, 42B. A first plurality of biasing members 46A, in the nature of compressible foam blocks, attaches the first substrate 42A substrate to a first side (or face) of the rigid retainer 50, whereas a second plurality of biasing members 46B, also in the nature of compressible foam blocks, attaches the second substrate 42B to a second side (or face) of the rigid retainer 50 on the opposite side of the first substrate 42A. The individual foam blocks 46A, 46B, which can be molded, cast, die cut, etc., can be attached to the retainer 50 and respective substrates 42A, 42B, for example, via adhesives, including air-cured adhesives, light-cured adhesives, heat-cured adhesives, moisture-cured adhesives and epoxy-based adhesives. As an additional or alternative option, the foam blocks 46A, 46B can be attached to the retainer 50 and respective substrates 42A, 42B via fasteners, clamps, or other mechanical devices, independently or in combination with an adhesive.

A pair of elastomeric guide rails 48A and 48B can be attached to each of the substrates 42A, 42B, respectively. Each of the guide rails 48A, 48B is shown disposed on an opposite side of the sensors 44A, 44B. Each guide rail 48A, 48B, which extends the length of the sensor assembly 40, includes recessed sections 49A and 49B that are longitudinally spaced along the substrate 42A, 42B to align with and nest therein one of the capacitor cans 14A, 14B. As seen in FIG. 4, for example, the centerline location of each recessed section 49A, 49B is generally aligned with the position of a corresponding sensor 44A, 44B. The recessed section 49A, 49B can also be contoured to generally conform to the shape of the surface of the device(s) being monitored. Optionally, different sections of the guide rails 48A, 48B can incorporate different materials with different coefficients of friction. For example, the outermost surface of the rails 48A, 48B could be made of a harder material with a lower coefficient of friction, while the surfaces of the recessed sections 49A, 49B could be made of a softer material, such as silicone foam, which has a higher coefficient of friction providing better "grip."

The biasing member(s) 46A, 46B are configured to contract, such that the overall width 52 (FIG. 4) of the sensor assembly 40 narrows, allowing for insertion thereof between the device(s) being monitored and an adjacent support surface (which may be a neighboring device(s)). Once the sensor assembly 40 is in place, the biasing member(s) 46A, 46B are configured to expand, such that the substrates 42A, 42B press outwardly against the device(s), securing the sensor assembly 40 in place between the device(s) and adjacent surface. In the temperature sensor assembly example presented above, the biasing members 46A, 46B can be pressed inwardly towards one another, for example, through the application of a compressive force by a user. In so doing, the initial width 52 of the sensor assembly 40, which is larger than the gap distance 56 (FIG. 3) between the two sets of tandem capacitor cans 12A, 12B, is condensed to a reduced width (represented in FIG. 4 at 54), which is less than the gap distance 56. Reducing the width 52 of the sensor assembly 40 to the reduced width 54 allows the sensor assembly to be inserted between (or be removed from) the sets of capacitor cans 12A, 12B. When the sensor assembly 40 is operatively positioned, as seen in FIG. 3, for example, the compressive force being applied to the biasing member(s) 46A, 46B is removed, which allows the biasing member(s) 46A, 46B to expand and push the opposing substrates 42A, 42B outwardly away from one another and press the sensors 44A, 44B and guide rails 48A, 48B into contact with the capacitor cans 14A, 14b. By this means, the sensor assembly 40 tensioned against and thereby secured between the first and second sets of tandem capacitor cans 12A, 12B. In some embodiments, the substrates 42A, 42B can therefore be characterized by an absence of structure designed to mechanically fasten the sensor assembly 40 to the device capacitor cans 14A, 14B.

Turning next to FIGS. 5-8, wherein similar reference numerals refer to similar components from FIGS. 1-4, additional exemplary sensor assemblies are presented in accordance with aspects of the present disclosure Like the sensor assembly 40 embodied in FIGS. 1-4, the sensor assemblies 140, 240, 340, and 440 of FIGS. 5-8, respectively, comprise two opposing substrates 42A, 42B with a corresponding plurality of sensors 44A, 44B (some including the ambient temperature sensor 45) mounted to each of the substrates 42A, 42B. Additional similarities between the embodiments of FIGS. 1-8 include, but are certainly not limited to, integration of the connectors 36A and 36B (e.g., FIGS. 5, 6 and 8), the elongated guide rails 48A, 48B (e.g., FIGS. 5 and 6), the foam blocks 46A, 46B, and the retainer 50 (FIG. 8). Unless otherwise logically restricted, the embodiments presented in FIGS. 5-8 can therefore incorporate the features discussed above with respect to FIGS. 1-4, singly or in any combination, without departing from the scope and spirit of the present disclosure.

In the sensor assembly 140 of FIG. 5, the biasing member 146 comprises an expansion mechanism (also referred to herein as "mechanical assembly") that allows the user to selectively expand the biasing member 146, and thus the entire sensor assembly 140, from a predetermined contracted thickness to a selected expanded thickness. The expansion mechanism is exemplified in FIG. 5 with a "feather-and-wedge" like arrangement comprising a wedge 160 that is movably disposed between opposing first and second shims (or "feathers") 162A and 162B. The first shim 162A is elongated longitudinally along and attached (e.g., adhered or fastened) to the first substrate 42A, whereas the second shim 162B is elongated longitudinally along and attached to the second substrate 42B. Projecting generally orthogonally from each shim 162A, 162B are a respective pair of guide arms 164A and 164B that lie along the side of and thereby guide the movement of the opposing shim 162B, 162A. The guide arms 164A, 164B also act to press against the inside surface of the opposing substrate 42B, 42A to restrict the amount to which the sensor assembly 140 can be contracted (i.e., limiting overall assembly contraction to a predetermined width). Each shim 162A, 162B has a plurality of longitudinally spaced angled (e.g., tapered, arcuate or eccentric) surfaces 166A and 166B, respectively, that are generally parallel to and operatively aligned for engagement with complementary angled (e.g., tapered, arcuate or eccentric) faces 168A and 168B, respectively, on the wedge 160. In some embodiments, the shims 162A, 162B attached to the substrates 42A, 42B can be rigid, generally firm, or partially compliant, while the wedge 160 component is typically rigid.

The wedge 160 is designed to translate rectilinearly in a first direction (e.g., to the right in FIG. 5) from a first position, e.g., whereat the angled faces 168A, 168B are displaced to the left of the angled surfaces 166A, 166B of the shims 164A, 164B, to a second position, e.g., whereat the angled faces 168A, 168B of the wedge 160 are operatively engaged with the angled surfaces 166A, 166B. When the wedge 160 is in the first position, the sensor assembly 140 is sufficiently narrow (e.g., the width 54 of FIG. 4) for insertion between the device and the adjacent surface/device. Contrastingly, when the wedge 160 is in the second position, the angled faces 168A, 168B press outwardly against the angled surfaces 166A, 166B, which acts to forces apart the first and second shims 162A, 162B, tensioning the sensor assembly 140, via elastomeric guide rails 48A, 48B, against the device and adjacent surface/device. In some embodiments, the wedge 160 can also translate in a second direction, back from the second position to the first position (e.g., to the left in FIG. 5), whereby the wedge 160 allows the shims 162A, 162B to draw together and, thus, the sensor assembly 140 to narrow for extraction from the device(s) being monitored.

The exemplary configuration of FIG. 5 shows the wedge 160 with a handle 170 that allows a user to pull the wedge 160 from the first position to the second position. Alternative configurations can include a wedge 160 with a chisel-butt-like protrusion to which can be applied a compressive force (e.g., via a hammer or mallet, or just the users hand) for pushing the wedge 160 from the first position to the second position. Other means for moving the wedge 160 are also envisioned, including components for automating the movement (e.g., an electric motor) and alternative manually-driven mechanisms (e.g., a power screw or ball screw arrangement).

In the illustrated embodiment, the angled surfaces 166A, 166B of the first and second shims 162A, 162B are serrated. Likewise, the opposing angled faces 168A, 168B of the wedge 160 are also serrated. Movement of the wedge 160 in the first direction (e.g., to the right in FIG. 5) will successively engage the serrated portions of the wedge 160 with the serrated portions of the shims 162A, 162B. Mating the serrated faces 168A, 168B with the serrated surfaces 166A, 166B acts to lock the expansion mechanism 146, and thus the sensor assembly 140, at any one of a plurality of selected expanded thicknesses. Although not shown, the sensor assembly 140 can include means for temporarily retaining the sensor assembly in a contracted position, such means including, for example, frangible connectors, biasing members, etc.

With reference now to FIG. 6, the sensor assembly 240 is nearly identical to the sensor assembly 40 of FIGS. 3 and 4, but utilizes one or more leaf spring elements 246 as the biasing member for attaching the two substrates 42A, 42B together. In the illustrated embodiment, three leaf spring elements 246 are disposed between and spaced longitudinally along to the first and second substrates 42A, 42B. The leaf spring elements 246 are attached to each of the substrates 42A, 42B via any number of means, including adhesives, pins, fasteners, and/or other mechanical means. The attachment bar 248 helps to hold the individual springs 246 in place during assembly of the sensor stick 240. Side 44B of the sensor assembly does not contain this bar 248. Like the biasing members 46A, 46B of FIGS. 3 and 4, the biasing members 246 are configured to compress, e.g., under a compressive force from the user, such that the overall width (e.g., width 52 of FIG. 4) of the sensor assembly 240 narrows, allowing for insertion thereof between the device(s) being monitored and adjacent support surface(s)/device(s). Once in place, the biasing members 246 are configured to expand, urging the substrates 42A, 42B outwardly to press against the device(s), securing the sensor assembly 40 in place between the device(s) and adjacent surface(s)/device(s). It is within the scope and spirit of the present disclosure to include greater or fewer than three leaf springs, which are singly or collectively attached to the substrates via alternative means. It is also possible to use alternative leaf spring arrangements, such as multileaf spring configurations, as well as other types of springs, such as helical springs and annular compression springs.

Turning to FIG. 7, a perspective-view illustration of yet another exemplary sensor assembly 340 is shown in accordance with aspects of the present disclosure. The sensor assembly 340 can be similarly configured to the sensor assembly 40 of FIGS. 3 and 4, as described above. Although not so restricted, the sensor assembly 340 is shown employing transceivers 236A and 236B attached to the distal ends of the substrates 42A, 42B, respectively, for transmitting and receiving signals, instead of the previously discussed SMA coax connectors 36A, 36B. In addition, the elastomeric guide rails 348A and 348B attached to the substrates 42A, 42B, respectively, of the sensor assembly 340 of FIG. 7 are thicker than the guide rails 48A, 48B of FIGS. 3 and 4, but are more flexible and contoured than the guide rails 48A, 48B to facilitate and simplify the insertion and extraction of the sensor assembly 340. In addition, each guide rail 348A, 348B is attached to its respective substrate 42A, 42B by a number of elastomeric projections, some of which are designated 380 in FIG. 7.

In the sensor assembly 340 of FIG. 7, the biasing member 346 comprises an expansion mechanism (also referred to herein as "mechanical assembly") that allows the user to selectively expand the biasing member 346, and thus the entire sensor assembly 340, from a predetermined contracted thickness to a selected expanded thickness. The expansion mechanism in FIG. 7 includes a cam shaft 360 bearing one or more longitudinally spaced cams 362. Each cam 362 is shown as an eccentric disk that is rotatably disposed within a respective cam slot 364 that is defined between first and second spars 366A and 366B. The first set of spars 366A is longitudinally spaced along and attached (e.g., adhered or fastened) to the first substrate 42A, whereas the second set of spars 366B is longitudinally spaced along and attached (e.g., adhered or fastened) to the second substrate 42B. The cam shaft 360 is configured to rotate in a first direction (e.g., 90 degrees clockwise in FIG. 7), whereby each cam 362 rotates within their respective cam slots 364 and the major length of the eccentric outer surface of the cam 362 presses against and thereby forces apart their respective spars 366A, 366B. In so doing, the substrates 42A, 42B are forced apart (i.e., outwardly), which in turn tensions the sensor assembly 340, via elastomeric guide rails 348A, 348B, against the device(s) being monitored and an adjacent surface(s)/device(s). The cam shaft 360 is further configured to rotate in a second direction (e.g., another 90 degrees clockwise or 90 degrees counterclockwise in FIG. 7), whereby each cam 362 rotates within their respective cam slots 364 and the minor length of the eccentric outer surface of the cam 362 engages (or disengages from) their respective spars 366A, 366B, which allows the first and second spars 366A, 366B and, thus, the substrates 42A, 42B to draw together.

In other embodiments of the present disclosure, the expansion mechanism comprises alternative means for selectively collapsing (narrowing) and erecting (widening) the sensor assembly. In a non-limiting example, the expansion mechanism could be fabricated from multiple components, including a hinged series of spars attached to alignment members for attachment to the substrate/sensor subassemblies, or molded or cast from a thermoplastic material that incorporates "living" hinges. A living hinge is a thin flexure bearing made, for example, from plastic that joins two more rigid plastic parts together, allowing them to bend along the line of the flexure bearing. In the collapsed state, the substrates and components of the expansion mechanism look similar to a collapsed or low-profile "Z", wherein the substrates are generally parallel and proximal one another with the expansion mechanism laying collapsed therebetween. When the sensor assembly is inserted between and properly positioned with respect to the device/ devices to be monitored, the expansion mechanism is pushed, pulled, or otherwise coaxed into the erect state, e.g., by moving the two substrates in a shearing motion), whereby the components of the expansion mechanism realign to a generally orthogonal orientation with respect to the two substrates. In so doing, the substrates are displaced away from one another such that the assembly would look similar to a capital "I". In this state, the expansion mechanism would push the sensor substrates and the sensors borne thereby into intimate contact with the device surface(s). As a lock-open assist, the hinged parts or living hinge components can open past center. An alternative, amorphic approach would incorporate a bladder (filled with either liquid or gas once in place) or an expandable material (e.g., smart materials that expand due to electrical charge, moisture application, mixing of multiple materials or compounds).

In yet another embodiment, the sensor assembly includes a unitary, single piece polymeric support body within which are embedded one or more sensors. The support body is compressible such that the sensor assembly can be squeezed and moved into position between the device(s) being monitored. The polymeric support body would then expand outwardly such that the one or more sensors are operatively positioned (e.g., moved into intimate contact) with the device(s). The polymeric support body can include a number if recessed section that are contoured to generally conform to the shape of the surface of the device(s) being monitored.

The sensor assembly 440 presented in FIG. 8 can be considered to be nearly identical to the sensor assembly of FIGS. 3 and 4, as described above. The primary point of demarcation between the sensor assembly 40 and sensor assembly 440 is the design of the optional guide rails 448A and 448B. Similar to the guide rails 48A, 48B of FIGS. 3 and 4, each guide rail 448A, 448B is attached to one of the substrates 42A, 42B, respectively, on an opposite sides of the sensors 44A, 44B. In contrast, however, each guide rail 448A, 448B, which extends the length of the sensor assembly 440, is contoured and includes a number of longitudinally spaced contoured and recessed pockets 470A and 470B, respectively. The recessed pockets 470A, 470B are shown with an arcuate contact surface that is designed to generally conform to the shape of the surface of the device (s) being monitored. By way of example, these pockets 470A, 470B can be designed to conform to the shape of the cylindrical capacitor cans 14A, 14B shown in FIGS. 1 and 2, and can be made of a flexible rubber-like material to provide further compliance. The contoured rails 448A, 448B include ramped (or tapered) leading segments 450A and 450B, respectively, on a first ("forward") side of the first recessed pocket 470A, 470B, which facilitates insertion of the sensor assembly 440. The contoured rails 448A, 448B also include raised trailing segments 452A and 452B, respectively, on a second (rearward) side of the first and second recessed pockets 470A, 470B, opposite the first side.

In some embodiments, the leading and trailing segments 450A, 450B, 452A, 452B have a first coefficient of friction, and the recessed pockets 470A, 470B have a second coefficient of friction greater than the first coefficient of friction. Generally speaking, the outermost surface of the sensor assembly, which are exemplified in the drawings in non-limiting examples by the various guide rails, can incorporate different materials with different coefficients of friction. For example the sensor assembly may allow easier positioning if the leading edges and raised surfaces are "slick" (i.e., have a low coefficient of friction) while the interface surfaces that contact the monitored device(s) may be "tacky" or "grippy"

(i.e., have a higher coefficient of friction) so that they provide slip resistant surfaces suitable for keeping the sensor stick assembly in place once the assembly is spread to the optimal width.

Figure 9:
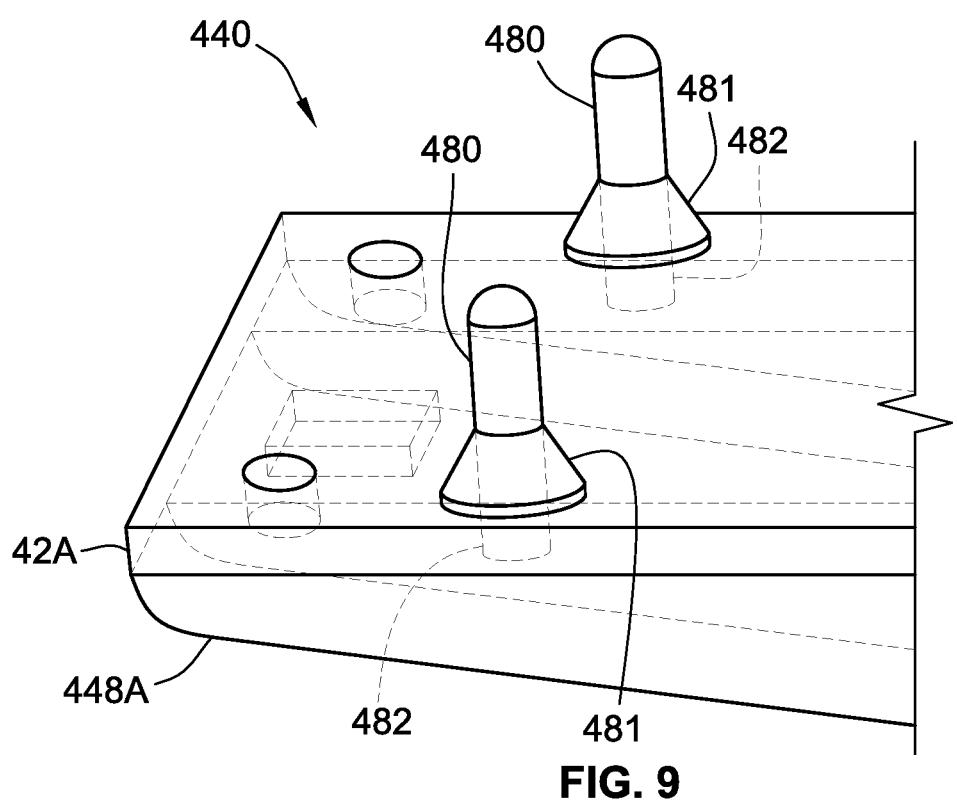
FIG. 9 is an enlarged perspective-view illustration of a portion of the exemplary sensor assembly of FIG. 8.

Each of the guide rails 448A, 448B is shown in FIG. 8 attached to its respective substrate 42A, 42B via a number of elastomeric projections (also referred to as "teats"), some of which are designated 480. FIG. 9 provides an enlarged view of these projections 480, illustrating that physical attachment may be accomplished by inserting the elastomeric tapered projections 480 into complementary receiving holes (shown hidden at 482) in the sensor substrates 42A, 42B. The projections 480 are then pulled and elongated as the rails 448A, 448B are brought into contact with the back surface of the substrate 42A, 42B. The projections 480 are then released and the expanded (wider) portions 481 provide a holding function and thereby mechanically fasten the rails 448A, 448B to the substrate 42A, 42B. Attachment can be accomplished via various molded or cut features in the foam layer; including but not limited to wedges, hooks, nubs, knobs, and hooks. These could engage openings in the substrate or protrusions off of the substrate surface.

Aspects of this disclosure provide simple and cost-effective methods, systems and devices for monitoring capacitor banks. However, many of the features presented herein are applicable to other systems and devices. Some of the advantages provided by the features of the present disclosure include early detection of capacitors that are not operating as effectively as desired, which can lead to more efficient power use and a lower electrical bill. Other benefits include early detection of capacitors whose electrical characteristics are exhibiting a trend toward a failure, thereby reducing potential operational concerns and damage to the rest of the capacitor bank. In addition, aspects of the present disclosure help minimize the need for regular manual inspection of capacitor banks, which reduces labor costs and provides for proactive notification to the customer and/or manufacturer of capacitors that require maintenance.

While particular embodiments and applications of the present disclosure have been illustrated and described, it is to be understood that this disclosure is not limited to the precise construction and compositions disclosed herein and that various modifications, changes, and variations can be apparent from the foregoing descriptions without departing from the spirit and scope of the invention as defined in the appended claims.

What is claimed is:

1. A temperature sensor assembly for a capacitor bank with a first set of tandem capacitor cans generally parallel to and spaced a gap distance from a second set of tandem capacitor cans, the temperature sensor assembly comprising:
    first and second opposing substrates;
    first and second pluralities of contact temperature sensors, each of the pluralities of contact temperature sensors being mounted to a respective one of the first and second substrates, wherein each of the contact temperature sensors is configured to directly contact a surface of a respective one of the capacitor cans and therefrom generate a first signal indicative of a temperature of the respective capacitor can; and
    a first biasing member attaching the first and second substrates together, wherein the first biasing member is configured to selectively contract to a first thickness such that a width of the sensor assembly is less than the gap distance and the sensor assembly can insert between the first and second sets of tandem capacitor cans, and selectively expand to a second thickness such that the width of the sensor assembly is substantially the gap distance wherein the sensor assembly, once inserted, is tensioned against and thereby secured between the first and second sets of tandem capacitor cans.

2. The sensor assembly of claim 1, further comprising a second biasing member connecting the second substrate to the first substrate, wherein the second biasing member is configured to selectively contract to a first thickness such that a width of the sensor assembly is less than the gap distance and the sensor assembly can insert between the first and second sets of tandem capacitor cans, and selectively expand to a second thickness such that the width of the sensor assembly is substantially the gap distance.

3. The sensor assembly of claim 2, further comprising a rigid retainer, wherein the first biasing member attaches the first substrate to a first side of the rigid retainer, and the second biasing member attaches the second substrate to a second side of the rigid retainer opposite the first side.

4. The sensor assembly of claim 1, wherein the first substrate includes an elongated rigid panel and wherein the first plurality of contact temperature sensors are spaced longitudinally along the panel such that each of the contact temperature sensors aligns for contact with a respective one of the capacitor cans when the sensor assembly is tensioned against the capacitor cans.

5. The sensor assembly of claim 4, further comprising an ambient temperature sensor attached to one of the first substrate and the second substrate and spaced from the capacitor cans.

6. The sensor assembly of claim 1, wherein the first substrate includes a printed circuit board (PCB), the PCB providing a path for transmitting the first signal generated by the first plurality of contact temperature sensors.

7. The sensor assembly of claim 1, wherein the first substrate is characterized by an absence of structure configured to mechanically fasten the sensor assembly to the first set of tandem capacitor cans.

8. The sensor assembly of claim 1, wherein the first biasing member includes a compressible foam.

9. The sensor assembly of claim 1, wherein the first biasing member includes a leaf spring.

10. The sensor assembly of claim 1, wherein the first and second biasing members comprise a mechanical assembly configured to allow a user to selectively expand the sensor assembly from a predetermined contracted thickness to a selected expanded thickness.

11. The sensor assembly of claim 10, wherein the mechanical assembly includes a first shim attached to the first substrate, a second shim attached to the second substrate, and a wedge disposed between the opposing first and second shims, the wedge being configured to translate from a first position, whereat the sensor assembly is sufficiently narrow for insertion between the first and second set of capacitor cans, to a second position, at which the wedge presses against and forces apart the first and second shims tensioning the sensor assembly against the first and second set of capacitor cans.

12. The sensor assembly of claim 11, wherein the first and second shims each has a respective serrated surface, and the wedge includes opposing first and second serrated faces each configured to engage a respective one of the serrated surfaces when the wedge is moved in the first direction, wherein the serrated faces mate with the serrated surfaces to lock the sensor assembly at the selected expanded thickness.

13. The sensor assembly of claim 10, wherein the mechanical assembly includes a first spar attached to the first substrate, a second spar attached to the second substrate, and a cam shaft bearing a cam disposed within a cam slot defined between the first and second spars, the cam shaft being configured to rotate in a first direction, whereby the cam presses against and forces apart the first and second spars, and a second direction, whereby the cam allows the first and second spars to draw together.

14. The sensor assembly of claim 1, further comprising a contoured rail attached to the first substrate adjacent the first plurality of contact temperature sensors to contact the surface of the first set of capacitor cans, the contoured rail having a recessed pocket with a contact surface generally conforming to the shape of each respective one of the capacitor cans.

15. The sensor assembly of claim 14, wherein the contoured rail includes a ramped leading segment on a first side of the recessed pocket and a raised trailing segment on a second side of the recessed pocket opposite the first side.

16. The sensor assembly of claim 15, wherein the leading and trailing segments have a first coefficient of friction, and the recessed pocket has a second coefficient of friction greater than the first coefficient of friction.

17. The sensor assembly of claim 1, wherein one of the first and second pluralities of contact temperature sensors includes a radio frequency (RF) surface acoustic wave (SAW) sensing device.

18. A method of measuring temperature in a capacitor bank a having a first set of tandem capacitor cans generally parallel to and spaced a gap distance from a second set of tandem capacitor cans using a temperature sensor assembly having first and second opposing substrates, first and second pluralities of contact temperature sensors being mounted to a respective one of the first and second substrates, and a biasing member attaching the first and second substrate together, the method comprising:
  selectively contracting the biasing member to a first thickness such that a width of the sensor assembly is less than the gap distance;
  inserting the sensor assembly between the first and second sets of tandem capacitor cans;
  expanding the biasing member to a second thickness such that the width of the sensor assembly is substantially the gap distance, wherein the sensor assembly, once inserted, is tensioned against and secured between the first and second sets of tandem capacitor cans; and
  generating a first signal indicative of a temperature of at least one capacitor can of the capacitor bank.

19. The method of claim 18, further comprising transmitting the generated first signal to a monitoring device.

20. The method of claim 19, wherein the sensor assembly includes an ambient temperature sensor attached to one of the first substrate and the second substrate and spaced from the capacitor cans, further comprising:
  generating a second signal indicative of an ambient temperature proximate the capacitor bank.

* * * * *